May 8, 1962 J. M. PAKULAK, JR., ET AL 3,033,020
THERMISTORIZED APPARATUS FOR DIFFERENTIAL THERMAL ANALYSIS
Filed Feb. 9, 1960 3 Sheets-Sheet 1
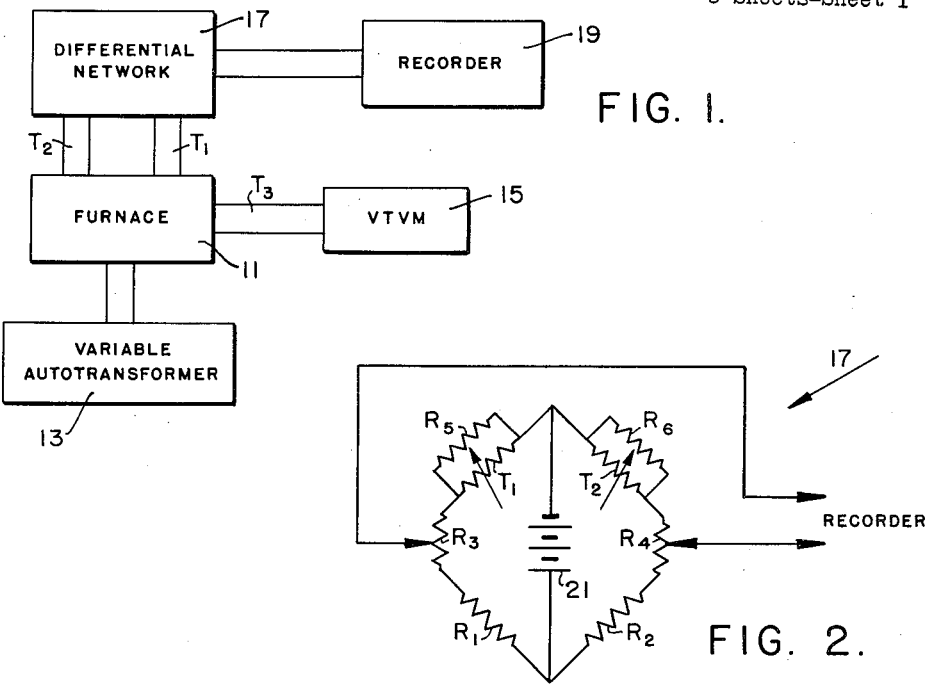
FIG. 1.
FIG. 2.
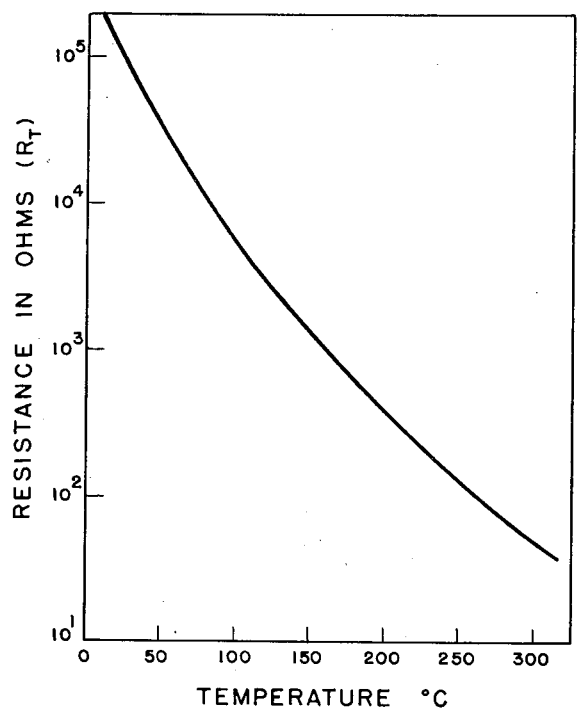
FIG. 3.
INVENTORS.
JACK M. PAKULAK, JR.
GUY WILLIAM LEONARD
BY
ATTORNEYS.

United States Patent Office 3,033,020
Patented May 8, 1962

3,033,020
THERMISTORIZED APPARATUS FOR DIFFERENTIAL THERMAL ANALYSIS
Jack M. Pakulak, Jr., % Chemistry Dept., University of Arizona, Tucson, Ariz., and Guy W. Leonard, 70–B Rodman, China Lake, Calif.
Filed Feb. 9, 1960, Ser. No. 7,733
1 Claim. (Cl. 73—15)
(Granted under Title 35, U.S. Code (1952), sec. 266)

The invention herein described may be manufactured and used by or for the Government of the United States of America for governmental purposes without the payment of any royalties thereon or therefor.

This invention relates to apparatus for performing differential thermal analysis and in particular to apparatus utilizing thermistors for this purpose.

Differential thermal analysis involves measuring the temperature difference between an inert reference material and a sample material under investigation as the temperatures of both materials are simultaneously increased at a constant rate. Any endothermal or exothermal changes of the sample material will cause its temperature to be lesser or greater, respectively, than that of the reference material since the reference material is inert and will not undergo thermal reactions. This differential temperature is recorded as a function of the reference material or furnace temperature.

The application of differential thermal analysis for the study of organic compounds is becoming increasingly important. Since the characteristic portions of the thermograms for most organic compounds lie in the 20°–300° C. range; a simple and very sensitive apparatus, using thermistors is herein described which has proven to be highly reliable and accurate in the temperature range indicated.

The prior apparatus for performing the above described method of differential thermal analysis has consisted of series-connecting a thermocouple disposed in the reference material with a thermocouple disposed in the sample material, applying the output thereof to a standard for obtaining the differential output, amplifying the differential output, recording this differential output and comparing this recorded differential output with the sample material thermocouple ice junction output. Due to the inherent limitations of thermocouples, difficulties have been encountered with systems of this type. Since thermocouples have low internal resistance it is necessary to employ compensating leads. In addition, a separate amplifier is necessary to highly amplify the relatively small output voltage of differentially connected thermocouples. Both of these factors tend to introduce error into the measurements and the latter considerably increases the cost of the system. Additional error is introduced and additional equipment is necessary because thermocouples require the use of ice junctions. Furthermore, the use of a thermocouple increases the probability of error since the base metals unless coated may react with the sample material in which it is disposed.

The present invention overcomes these difficulties by simplifying the apparatus, reducing the cost and increasing the accuracy of results obtained by differential thermal analysis. It has been found that a pair of shunted thermistors disposed in adjacent legs of a differential bridge network, the output of which is applied to a recorder provides a highly sensitive and reliable method for performing differential thermal analysis. Because of the very high negative temperature coefficient of thermistors, they can be used as sensing devices in the accurate measurement of extremely small temperature differentials which has heretofore been impossible. Since the resistance of a thermistor decreases approximately logarithmically with linear increase temperature, the thermistor is shunted so that the effective resistance decreases linearly with linear increase of temperature.

An object of the present invention is to provide highly reliable and accurate apparatus for performing differential thermal analysis.

Another object is to provide a highly reliable and accurate apparatus for performing differential thermal analysis in the temperature range of from about 20° C. to about 300° C.

A further object is to provide apparatus for performing differential thermal analysis wherein it is not necessary to amplify the differential voltage.

A still further object is to provide apparatus for performing differential thermal analysis which utilizes thermistors.

A still further object is to provide apparatus for performing differential thermal analysis which utilizes shunted thermistors in a differential bridge network for obtaining linear differential voltage with linear increase in thermistor temperature.

Other objects and many of the attendant advantages of this invention will become readily appreciated as the same becomes better understood by reference to the following detailed description when considered in connection with the accompanying drawings wherein:

FIG. 1 is a diagrammatic illustration of the system apparatus for performing differential thermal analysis;

FIG. 2 is a schematic diagram of the differential network of FIG. 1;

FIG. 3 is a curve illustrating the resistance-temperature characteristics of a thermistor;

Figure 4:
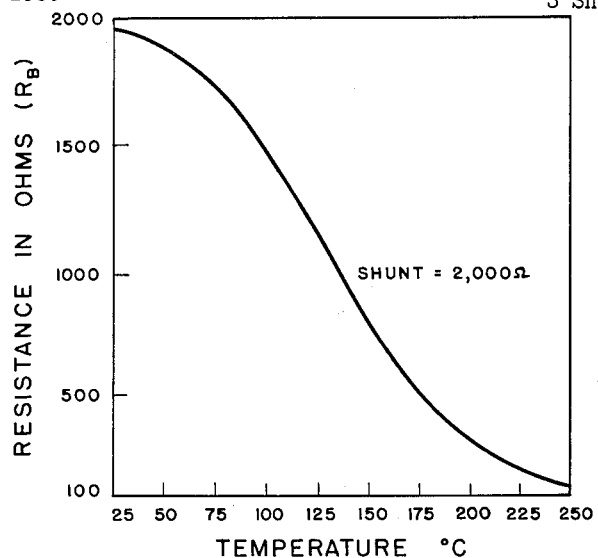
FIG. 4 is a curve illustrating the resistance-temperature characteristics of the shunted thermistor embodied in this invention.

Referring now to FIG. 1 of the drawings is diagrammatically illustrated a differential thermal analysis system including a furnace 11 the temperature of which is controlled to increase linearly with respect to time by means of variable autotransformer 13. A temperature increase of approximately 2° C. per minute has been found to produce excellent results. Three thermistors are disposed within the furnace. One of these thermistors is temperature calibrated and is disposed in an inert reference material wherein the leads $T_3$ thereof are connected to vacuum tube voltmeter 15 for denoting the furnace or material temperature. The other two thermistors are disposed in sample and inert reference materials, respectively, and the leads $T_1$ and $T_2$ thereof are connected to adjacent legs of differential network 17 for determining the temperature differential between the sample and reference materials. The differential voltage output from the network is applied to recorder 19 to obtain a thermogram of the type shown in FIG. 6 and the furnace or material temperature denoted by vacuum tube voltmeter 15 is recorded on this thermogram.

In FIG. 2 is schematically shown differential network 17 of FIG. 1. This network comprises a bridge with one leg including thermistor resistance denoted by $T_1$, an adjacent leg including a matched thermistor resistance denoted by $T_2$ and the other two legs including matched resistors $R_1$ and $R_2$. Disposed in the bridge between resistors $T_1$ and $R_1$ is a resistor $R_3$ and between $T_2$ and $R_2$ is a resistor $R_4$. Voltage supply 21 is connected between resistors $T_1$ and $T_2$ and $R_1$ and $R_2$, respectively. Thermistor resistances $T_1$ and $T_2$ are shunted by resistors $R_5$ and $R_6$, respectively. From FIG. 3 it can be seen that the resistance of a thermistor decreases approximately logarithmically with linear increase of temperature. It has been found that by shunting the thermistor resistance, an effective resistance that decreases approximately linearly with linear increase of temperature is obtained. This reduces the sensitivity of the thermistor; however, the resulting sensitivity is more than sufficient for the investigation of most organic compounds. From FIG. 4 it can be seen that the combined parallel resistance $R_B$ of the thermistor and shunt provides a linear response obtained in the range of approximately 70 to 190° C. The results of the curves of FIGS. 3 and 4 were obtained with a 100,000 ohm thermistor and a 2000 ohm shunt. It is to be understood that different linearity ranges could be obtained by selection of different thermistor and shunt values. The resistance of resistors $R_1$ and $R_2$ is approximately 1000 ohms which value corresponds with the $R_B$ value of 1000 ohms at the midpoint in the optimum range of operation of FIG. 4. The final balancing of the bridge is accomplished by varying the position of the control taps slidable on resistors $R_3$ and $R_4$ and the voltage across these taps is applied to recorder 19.

Figure 5:
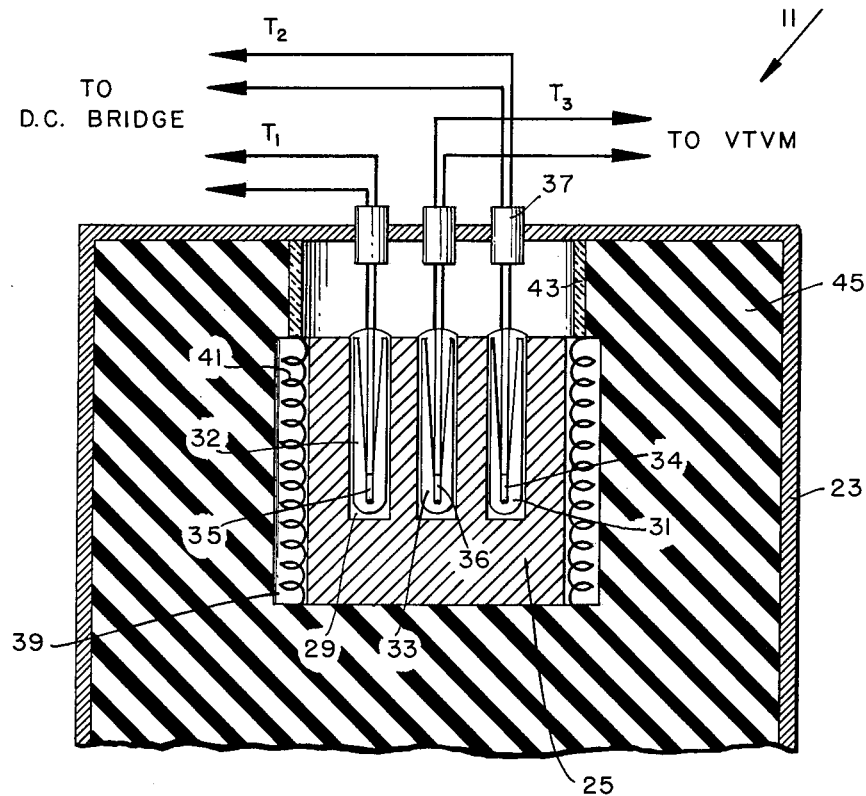
FIG. 5 is a sectional side elevation of the furnace of FIG. 1.

In FIG. 5 is shown a sectional side elevation of furnace 11 of FIG. 1. The furnace comprises an outer cylindrical aluminum shell 23 and an inner cylindrical, black anodized, aluminum block 25 which is concentrically disposed within shell 23. Extending downwardly from the upper surface of block 25 are a plurality of axially parallel cylindrical cavities 29 into which are placed containers 31, 32 and 33. Into container 31 is placed thermistor 34 and sufficient sample material to cover the end thereof, into container 32 is placed thermistor 35 and sufficient inert reference material to cover the end thereof and into container 33 is placed a temperature calibrated thermistor 36 and sufficient inert reference material to cover the end thereof. Leads $T_1$ and $T_2$ of thermistors 35 and 34, respectively, are connected to adjacent legs of differential network 17 of FIGS. 1 and 2 and leads $T_3$ of calibrated thermistor 36 are connected to vacuum tube voltmeter 15 of FIG. 1. Insulators 37 are provided to shield leads $T_1$, $T_2$ and $T_3$ from shell 23. Hollow cylinder 39 concentrically surrounds block 25 thus forming a cavity therebetween and electric coil 41 is disposed within this cavity and surrounds block 25 thereby providing heat for the furnace. Block 25 and cylinder 39 are supported by means of cylindrical glass ring 43 which is fixed to the upper surface of shell 23 and packing material 45 is provided to insulate block 25.

Figure 6:
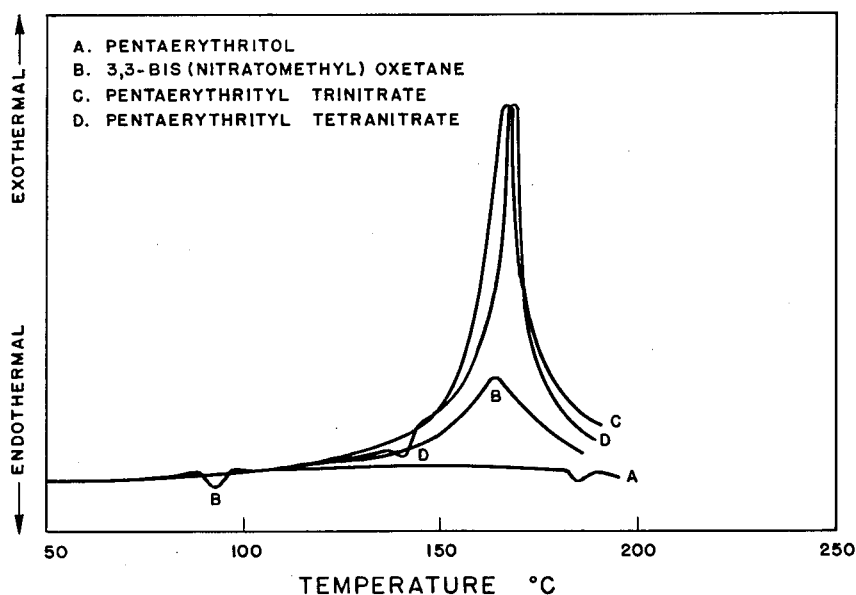
FIG. 6 is a family of curves illustrating the thermograms of the pentaerythritol series as obtained by practice of the present invention.

FIG. 6 is a graph showing the thermal behavior of the pentaerythritol series. Curve A represents pentaerythritol, B represents 3,3-bis(nitratomethyl)oxetane, C represents pentaerythrityl trinitrate and D represents pentaerythrityl tetranitrate. Each of the compounds in this series has its own characterizing thermogram. It can be seen that compounds A, B and D manifest an endothermic reaction in the temperature range covered and compounds B, C and D have large distinct exothermic reactions in the 160 to 190° C. region. The endothermic peaks correspond to the respective melting points. It has been very difficult to obtain reliable results with compounds such as these with prior methods of differential thermal analysis; however, the present method provides highly reliable and accurate results.

Obviously many modifications and variations of the present invention are possible in the light of the above teachings. It is therefore to be understood that within the scope of the appended claim the invention may be practiced otherwise than as specifically described.

What is claimed is:

A thermistorized apparatus for differential thermal analysis comprising a furnace including an outer cylindrical aluminum shell and an inner cylindrical, black anodized, aluminum block concentrically disposed within said shell, said block having extending downwardly from its upper surface three axially parallel cylindrical cavities; three containers, one of which is positioned within each of said cavities; two matched thermistors and one calibrated thermistor, one matched thermistor positioned within one of said containers and covered with a sample material, said thermistor having electrical leads extending to and connected with a differential network located outside the furnace, the other matched thermistor positioned within another of said containers and covered with an inert reference material and having electrical leads connected to said differential network, the calibrated thermistor positioned within the third of said containers which is located between the first two described matched thermistors, said calibrated thermistor being covered with an inert reference material and being connected by electrical leads to a voltmeter; whereby upon the application of heat the temperature differential between the sample and reference materials is recorded.

References Cited in the file of this patent

UNITED STATES PATENTS

| | | |
|---|---|---|
| 2,330,599 | Kuehni | Sept. 28, 1943 |
| 2,565,230 | Hebler | Aug. 21, 1951 |
| 2,583,930 | Cotton | Jan. 29, 1952 |
| 2,741,126 | Anderson et al. | Apr. 10, 1956 |
| 2,903,204 | Nyman et al. | Sept. 8, 1959 |

OTHER REFERENCES

Publication by Ullman in Electronic Equipment, June 1956, 73-362(R).